(12) United States Patent
Kinney

(10) Patent No.: US 9,117,473 B1
(45) Date of Patent: Aug. 25, 2015

(54) BEMF CLOSED LOOP CONTROL OF DISK DRIVE ACTUATOR DURING A CATASTROPHIC EVENT

(71) Applicant: Seagate Technology LLC, Cupertino, CA (US)

(72) Inventor: Dwight Russell Kinney, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/551,784

(22) Filed: Nov. 24, 2014

(51) Int. Cl.
*G11B 21/02* (2006.01)
*G11B 5/596* (2006.01)

(52) U.S. Cl.
CPC ................... *G11B 5/59633* (2013.01)

(58) Field of Classification Search
CPC .. G11B 5/5547; G11B 21/083; G11B 5/5521; G11B 5/6005; G11B 5/59633; G11B 5/54; G11B 5/59127
USPC ............... 360/75, 78.06, 78.04, 77.07, 78.01, 360/78.12; 318/400.01, 400.34
See application file for complete search history.

(56) References Cited

U.S. PATENT DOCUMENTS

| | | | |
|---|---|---|---|
| 5,844,743 A | 12/1998 | Funches | |
| 6,498,698 B1* | 12/2002 | Golowka et al. | 360/78.12 |
| 6,697,207 B2* | 2/2004 | Harmer | 360/75 |
| 7,064,919 B2* | 6/2006 | Inaji et al. | 360/78.06 |
| 7,068,463 B1* | 6/2006 | Ji et al. | 360/78.04 |
| 7,265,931 B2* | 9/2007 | Ehrlich | 360/77.02 |
| 7,573,670 B1* | 8/2009 | Ryan et al. | 360/75 |
| 7,800,324 B2* | 9/2010 | Linggajaya et al. | 318/400.01 |
| 2004/0257693 A1* | 12/2004 | Ehrlich | 360/77.02 |

* cited by examiner

*Primary Examiner* — Nabil Hindi
(74) *Attorney, Agent, or Firm* — Hollingsworth Davis, LLC

(57) ABSTRACT

A disk drive includes an actuator assembly and a controller. The actuator assembly generally includes an actuator having a velocity and a voice coil motor that has a detectable back electromotive force (BEMF). The actuator assembly is configured to position a read/write head. The controller is coupled to the actuator assembly and is configured to detect a catastrophic event occurring within the disk drive. In response to the detection of the catastrophic event, the controller activates a closed loop controlled slowing of the velocity using the detected BEMF as a control parameter.

19 Claims, 5 Drawing Sheets

BEMF CLOSED LOOP CONTROL OF DISK DRIVE ACTUATOR DURING A CATASTROPHIC EVENT

SUMMARY

A disk drive of the present disclosure includes an actuator assembly and a controller. The actuator assembly generally includes an actuator having a velocity and a voice coil motor that has a detectable back electromotive force (BEMF). The actuator assembly is configured to position a read/write head. The controller is coupled to the actuator assembly and is configured to detect a catastrophic event occurring within the disk drive. In response to the detection of the catastrophic event, the controller activates a closed loop controlled slowing of the velocity using the detected BEMF as a control parameter.

A method of the present disclosure includes detecting a catastrophic event within a disk drive and slowing the velocity of an actuator assembly, and, more particularly, slowing the velocity of the actuator of the actuator assembly, through closed loop control of the velocity. The closed loop control is dependent upon monitoring of an actual back electromotive force (BEMF) of the actuator assembly, and, more particularly, is dependent upon monitoring of the BEMF of a voice coil motor of the actuator assembly.

A system of the present disclosure comprises a closed loop control system configured to slow the velocity of an actuator assembly, and, more particularly, configured to slow the velocity of an actuator of the actuator assembly. The closed loop control system utilizes detected back electromotive force (BEMF) of the actuator assembly, and, more particularly, utilizes detected BEMF of a voice coil motor of the actuator assembly, to achieve the slowing of the velocity.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator as it seeks from track to track. During a seek operation the rotary actuator of the disk drive is typically moving at high velocity, e.g., in excess of 100 in./sec., and, as such, any interruption to the servo control system, such that the servo control system has lost confidence in the positional information provided by the heads, establishes a catastrophic event that necessitates that the actuator be stopped as quickly as possible to prevent damage to the disk drive components. The servo control system may lose confidence in positional information, for example, upon a seek failure wherein the control algorithm has lost sense of where the heads are and/or how fast the heads are moving relative to the disk. Such a situation may occur when the servo control system has failed to read the disk servo positioning information entirely or the disk servo positioning information being read is corrupted. Therefore, upon the occurrence of a catastrophic event, another means of determining actuator velocity must be employed.

The present disclosure is directed to determining actuator velocity during a catastrophic event through use of the generated back electro-motive force (BEMF) voltage of the VCM and to using generated BEMF voltage as an alternative source of velocity information to bring the runaway actuator to a stop as quickly as possible before causing irreparable damage to the disk drive.

Figure 1:
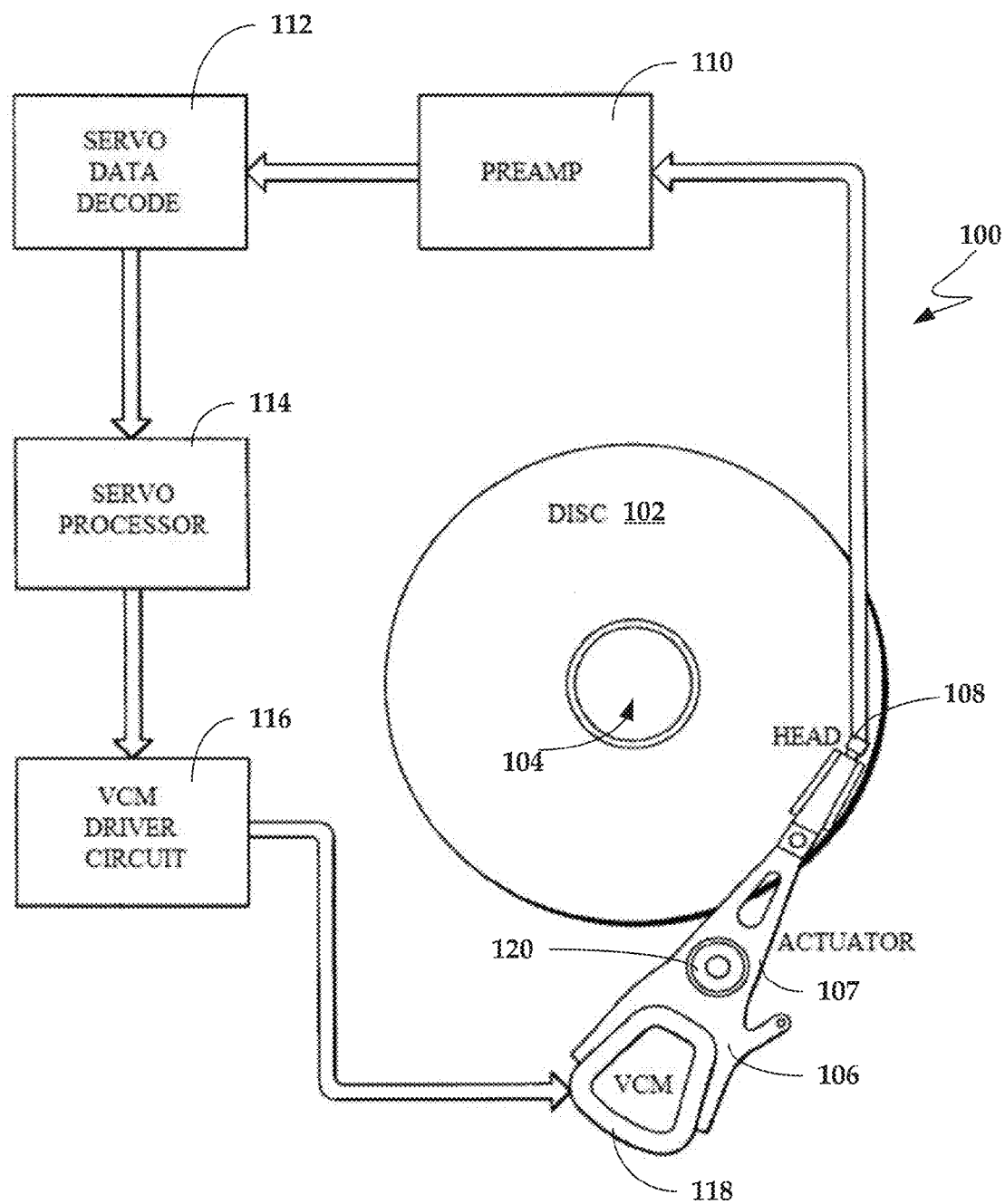
FIG. 1 is a block diagram of a disk drive servo system.

FIG. 1 provides a block diagram illustrating a typical servo loop commonly used in a disk drive. As shown, the disk drive 100 includes a disk 102 which is rotated at a substantially constant rotational velocity by a spindle motor (shown generally at 104). An actuator assembly 106 is mounted for controlled rotation adjacent the disk 102 and includes a head 108 used in the reading and writing of data from and to the disk 102. The actuator assembly 106 further includes the actuator 107 itself and motor, e.g., VCM 118. It should be noted that for ease of explanation, the disk drive 100 has been illustrated as having a single disk and a single head but in reality may include a plurality of disks and heads.

During a seek operation of the servo loop of FIG. 1, servo information is read by the head 108 from the disk 102 and provided in the form of analog read signals to a preamplifier 110, which amplifies the signals accordingly. The amplified signals are provided to servo data decode circuitry 112, which includes, for example, an analog-to-digital (A/D) converter and other decoding circuitry to provide digital representations of servo burst signals to a servo microprocessor/controller 114. The magnitudes of the servo burst signals generally indicate the relative distance between the head 108 and the center of a disk track and are manipulated to form a position error signal (PES).

The servo microprocessor/controller 114 generates correction signals from the PES and provides the correction signals to a VCM driver circuit 116 in order to control the magnitude and polarity of current applied to a voice coil motor (VCM) 118 of the actuator assembly 106. The VCM driver circuit 116 accepts control commands from the servo microprocessor 114 and converts them into current that passes through the VCM coil 118. The VCM coil 118 is immersed in a magnetic field generated from one or more high-field strength permanent magnets and associated flux paths. The interaction between the magnetic fields established by the current through the VCM coil 118 with the magnetic field of the VCM causes the actuator assembly 106 to pivot about a bearing shaft assembly 120, causing the head 108 to move at high speed relative to the disk 102 accordingly.

Upon the occurrence of a catastrophic event, as described earlier, consideration is made to slow the actuator and prevent damage to the disk drive. The approach described in the present disclosure is to use the BEMF voltage that is generated by the motion of the VCM. BEMF voltage is directly proportional to the angular velocity of the moving VCM. As such, it is a good representation of the true velocity of the actuator which can be used as feedback to accurately stop the actuator. There are generally two methods of utilizing BEMF: (1) continuous application; and (2) discontinuous application.

Continuous application allows uninterrupted sensing of the BEMF while concurrently and continuously applying braking current to the VCM. The analog circuitry to achieve the continuous application needs to be carefully calibrated.

In a discontinuous application, the electronic circuitry does not require calibration. Instead, the discontinuous application methodology senses the BEMF quite differently than does the continuous application in that the voltage is first sampled and then the braking current is applied to the VCM. During the time the BEMF is being measured, the braking current is disabled. Similarly, BEMF sensing is disallowed during the time that the braking current is applied to the VCM. The process of applying braking current is interrupted whenever BEMF is measured, hence, the term "discontinuous" application. The delay incurred prior to measuring the BEMF voltage must be sufficient to allow the inductive currents to decay so that the measurement includes only the steady state voltage.

Figure 2:
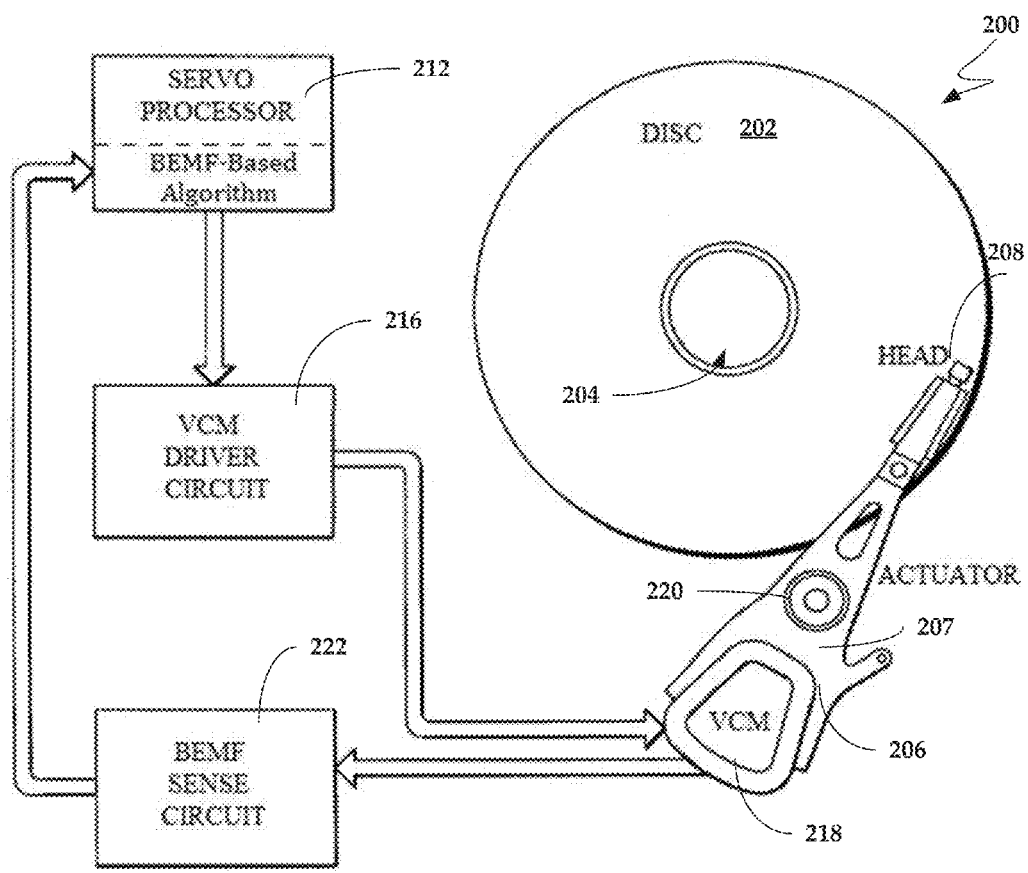
FIG. 2 is a block diagram of a disk drive servo system configured to manage a catastrophic event according to an example embodiment.

A closed loop architecture that may be used to implement continuous or discontinuous BEMF-based feedback to control the velocity of the actuator to a desired value upon the occurrence of a catastrophic event is illustrated in FIG. 2. As shown, the closed loop control system of disk drive 200 includes disk 202, spindle motor (shown generally at 204), actuator assembly 206 with actuator 207, head 208 and VCM 218, as well as servo microprocessor/controller 212, VCM driver circuit 216, and bearing shaft assembly 220. Additionally included within the disk drive 200 is the BEMF sense circuit 222, which is coupled between the servo microprocessor/controller 212 and the VCM 218. With the illustrated architecture, "real" velocity can be accurately determined using the sensed BEMF voltage generated from the moving actuator/VCM. The sensed BEMF voltage can then be incorporated into a closed loop algorithm, coded in the microprocessor/controller 212, for the purpose of effectively stopping the actuator.

Figure 3:
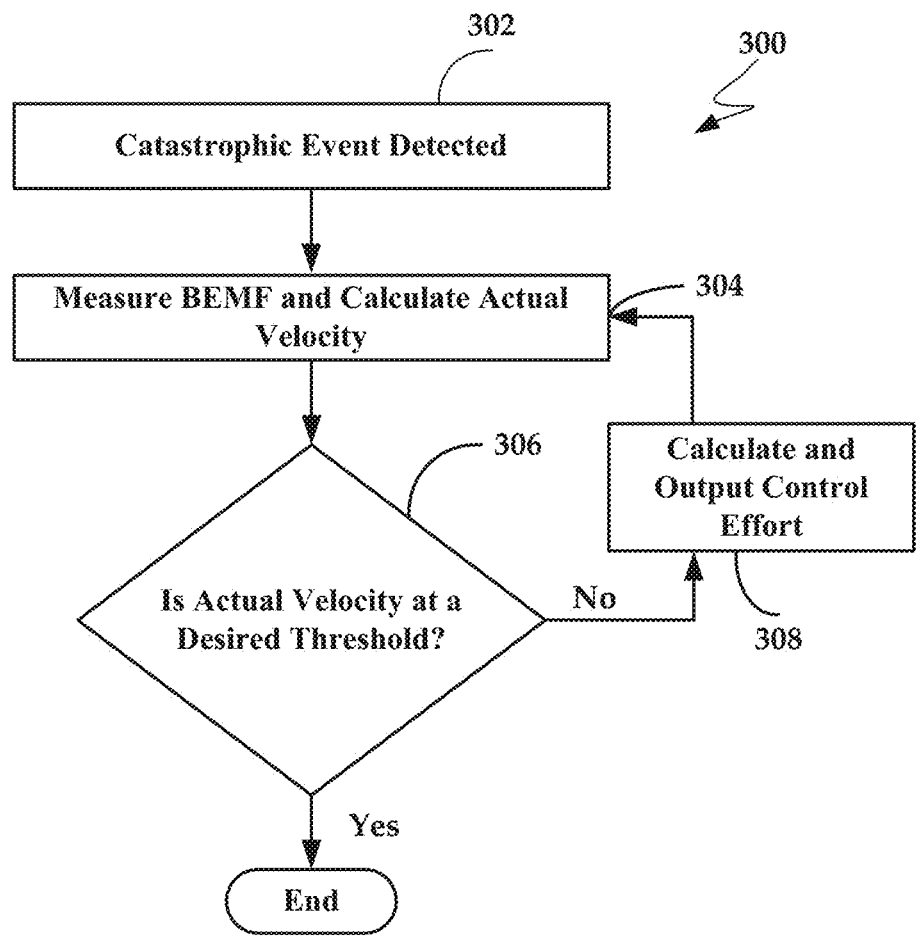
FIG. 3 is a flowchart illustrating a method according to an example embodiment.

FIG. 3 is a flowchart illustrating an example embodiment of a closed loop method 300 of stopping a disk drive actuator upon detection of a catastrophic event; the method 300 is configured to implement the closed loop architecture of FIG. 2. First, upon a catastrophic event being detected 302, the BEMF of the VCM is measured and actual velocity of the actuator is calculated 304. If the actual velocity is not at a desired safety level threshold 306, a calculation is made as to how further slowing of the velocity should be achieved and an output control command corresponding to the calculation is produced to effectuate the slowing of the velocity of the actuator 308. Subsequently, the BEMF is once again measured and the actual velocity is calculated 304. If the actual velocity of the actuator meets or falls below the desired safety level threshold 306, the actuator has reached a safe velocity or stopped, and further control of the velocity is disabled.

Figure 4:
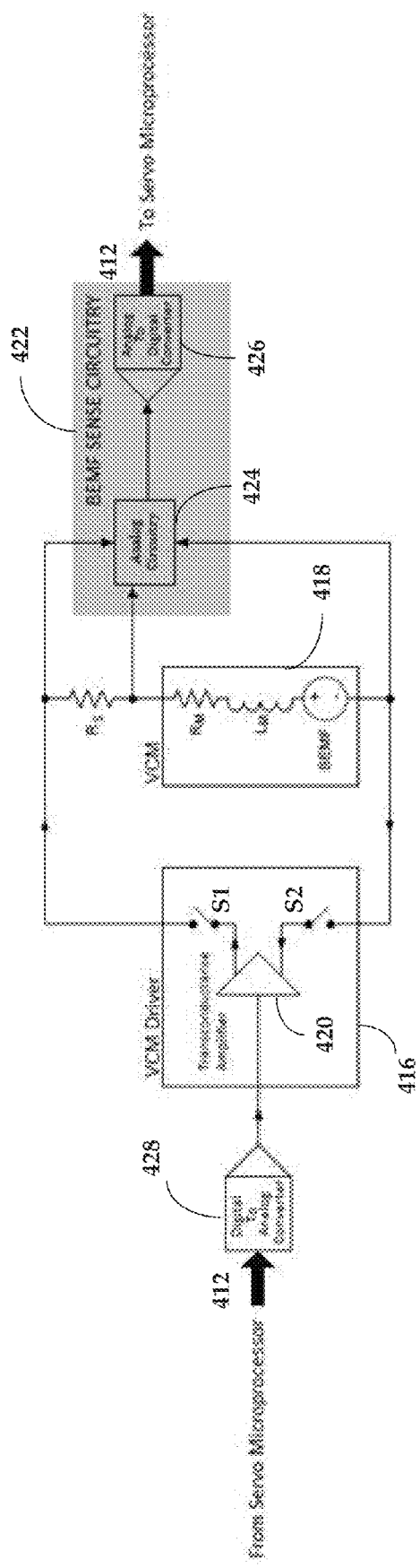
FIG. 4 is a simplified circuit diagram illustrating the manner in which back electro motive force (BEMF) may be used in a closed loop control scheme, according to an example embodiment.

FIG. 4 provides a simplified circuit diagram illustrating an example configuration of the circuitry used to enable the closed loop braking control described above. The circuit generally includes VCM driver 416, VCM 418 and BEMF sense circuitry 422, VCM driver 416 includes a transconductance amplifier 420 as well as electronic transistor switches S1 and S2. VCM 418 includes a motor resistance $R_M$, motor inductance $L_M$, and BEMF voltage. A sensing resistor $R_S$ is coupled to the BEMF sense circuitry 422, which includes analog circuitry 424 and an A/D converter 426. The analog circuitry 424 can be configured to support either continuous or discontinuous BEMF applications. Braking commands are sent from the microprocessor/controller 412 to a D/A converter (DAC) 428. The DAC 428 converts servo commands into analog voltages that are then passed to the VCM 418 via the transconductance amplifier 420 that is intrinsic to the VCM driver 416.

In the instance of a discontinuous BEMF application, the circuit of FIG. 4 provides for the following operation. When the switches S1 and S2 of the VCM driver 416 are open, no braking current is applied to the VCM 418 and the BEMF voltage generated by the VCM 418 is measured and submitted to analog circuitry 424, for example a filter, before being converted into digital data by A/D converter 426 and passed to the servo microprocessor/controller 412. The braking algorithm within the servo microprocessor/controller 412 then computes velocity based on the measured BEMF voltage, determines an appropriate braking command and sends the command to the VCM driver 416 via the D/A converter 428 and a transconductance amplifier 420. When the switches S1 and S2 of the VCM driver 416 are closed, the commanded braking current is applied to the coil 418. With the discontinuous BEMF application, the closed loop control system alternates between measuring the BEMF voltage and applying the braking current to the VCM until a safe or zero velocity is achieved. In a continuous BEMF application, switches S1 and S2 would remain actively closed while concurrently measuring the BEMF voltage and applying braking current to the VCM.

Using the BEMF generated by the VCM yields a very good representation of the true velocity of the actuator. As an added benefit, this velocity can be integrated mathematically to produce a reasonable estimate of the distance the actuator has traveled through the braking process occurring in response to a catastrophic event. Furthermore, this integrated velocity (estimated position) can provide an indication of distance traveled when controlling velocity following the braking process. An application of this may include, but is not limited to, stopping the runaway actuator and then moving the actuator away from the extreme outer diameter (OD) edge of the disk a prescribed distance toward the center of the disk. For disk drives containing load/unload ramps at the OD of the disk, this procedure may be used to avoid contacting, or maintaining contact with, the ramp.

Figure 5:
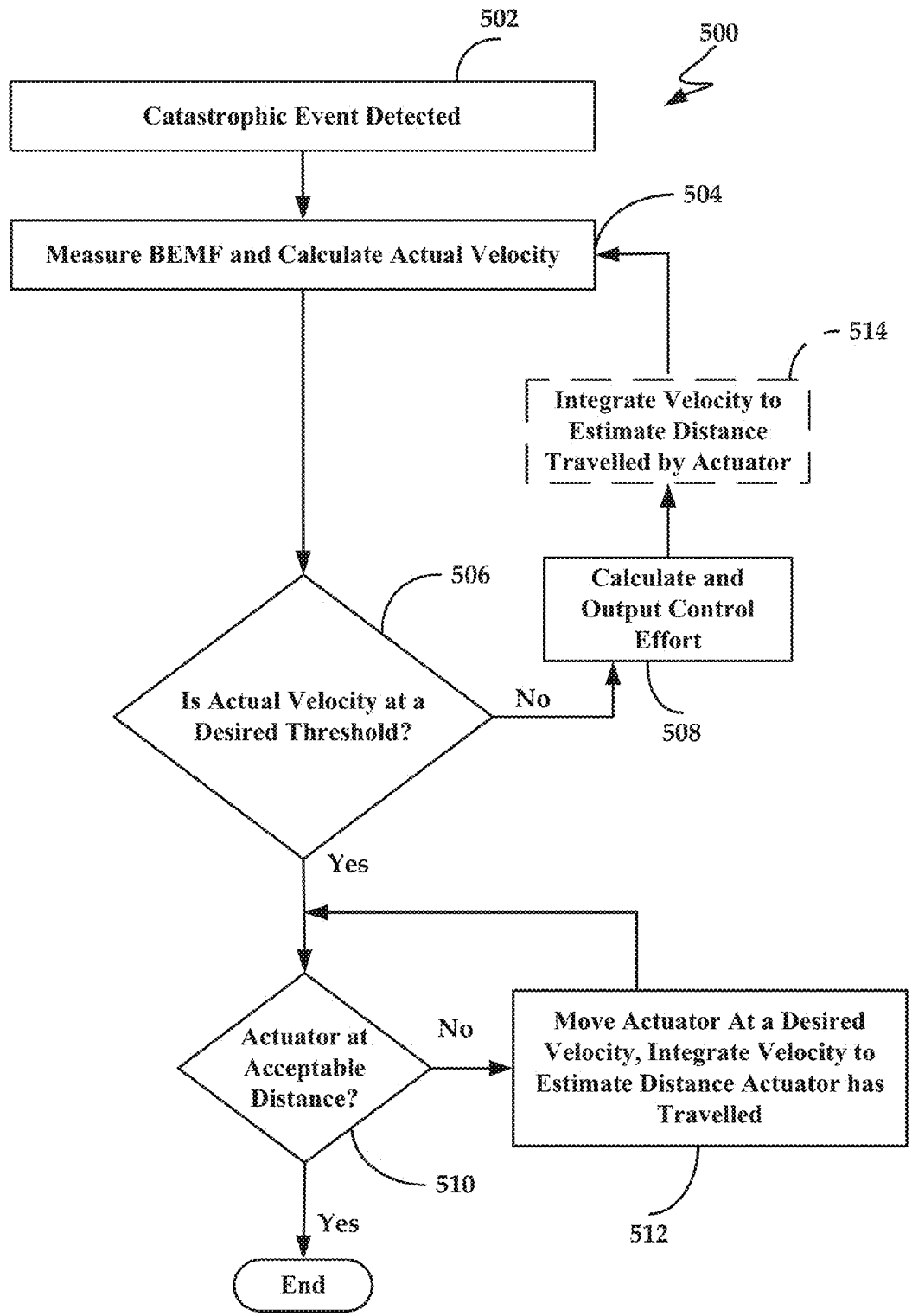
FIG. 5 is a flowchart illustrating a method according to an example embodiment.

FIG. 5 is a flowchart illustrating an example embodiment of a closed loop method 500 of stopping a disk drive actuator upon detection of a catastrophic event with the added function of estimating actuator travel and adjusting the position of the actuator in response thereto. First, upon a catastrophic event being detected 502, the BEMF of the VCM is measured and actual velocity of the actuator is calculated 504. If the actual velocity is not at a desired safety level threshold 506, a calculation is made as to how further slowing of the velocity should be achieved and an output control command corresponding to the calculation is produced to effectuate the slowing of the velocity of the actuator 508. Optionally, the velocity of the actuator may be integrated to provide an estimate of distance the actuator has travelled 514; the distance may be recorded/tracked and used a distance reference for additional operations, e.g., steps 510 and 512 described below. Subsequently, the BEMF is once again measured and the actual velocity is calculated 504. If the actual velocity of the actuator meets or falls below the desired safety level threshold 506, the actuator has reached a safe velocity or stopped. At this point, if it is believed that the actuator is close to or in the region of the OD ramp, e.g., the actuator is not positioned in the drive at an acceptable distance away from the ramp 510, then the actuator is moved at a desired velocity and the velocity of the actuator is integrated to estimate the distance has now traveled 512. If the actuator is positioned at an acceptable distance 510, then management ent of the catastrophic event has concluded. If the actuator is not positioned at an acceptable distance, step 512 is repeated.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor/controller. Such instructions may be stored on a non-transitory computer-readable medium and transferred to the processor/controller for execution as is known in the art.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. A disk drive, comprising:
an actuator assembly configured to position a read/write head, the actuator assembly having a velocity and a detectable back electromotive force (BEMF);
a controller coupled to the actuator assembly, the controller configured to detect a catastrophic event occurring within the disk drive,
wherein in response to the detection of the catastrophic event the controller activates a closed loop controlled slowing of the velocity, wherein the closed loop controlled slowing utilizes detected BEMF of the actuator assembly as a control parameter.

2. The disk drive of claim 1, wherein the closed loop controlled slowing is initiated upon the velocity of the actuator assembly reaching a desired level.

3. The disk drive of claim 1, wherein the detected BEMF comprises discontinuously detected BEMF.

4. The disk drive of claim 3, wherein the closed loop controlled slowing includes applying a brake current to the actuator assembly when the BEMF is not being detected.

5. The disk drive of claim 1, wherein the detected BEMF comprises continuously detected BEMF.

6. The disk drive of claim 1, wherein the detected BEMF is configured to provide an estimation of distance traveled by the actuator assembly.

7. The disk drive of claim 6, wherein the estimation of distance configured to be provided during and/or after the catastrophic event.

8. A method, comprising:
detecting a catastrophic event within a disk drive; and
slowing the velocity of an actuator assembly of the disk drive through closed loop control of the velocity, wherein the closed loop control is dependent upon monitoring of a back electromotive force (BEMF) of the actuator assembly.

9. The method of claim 8, wherein detecting a catastrophic event comprises detecting a lack of servo positioning information.

10. The method of claim 8, wherein the monitoring of the BEMF comprises discontinuous monitoring of the BEMF.

11. The method of claim 10, wherein closed loop control of the velocity comprises applying a braking current to the actuator assembly when the BEMF is not being monitored.

12. The method of claim 8, wherein the monitoring of the BEMF comprises continuous monitoring of the BEMF.

13. The method of claim 8, further comprising using the BEMF to estimate a distance travelled by the actuator assembly.

14. The method of claim 13, wherein using the BEMF to estimate a distance travelled by the actuator assembly is performed during and/or after the catastrophic event.

15. A system, comprising:
a closed loop control system configured to slow the velocity of an actuator assembly, wherein the closed loop control system utilizes discontinuously detected back electromotive force (BEMF) of the actuator assembly to achieve the slowing of the velocity of the actuator assembly.

16. The system of claim 15, wherein the closed loop control system applies braking to the actuator assembly velocity when the BEMF is not being detected.

17. The system of claim 16, wherein the closed loop control system utilizes continuously detected BEMF of the actuator assembly.

18. The system of claim 15, wherein the detected BEMF is configured to provide an estimation of distance traveled by the actuator assembly.

19. The system of claim 18, wherein the estimation of distance is configured to be provided during and/or after the catastrophic event.

* * * * *